United States Patent [19]

LaMont

[11] 4,330,148
[45] May 18, 1982

[54] ADJUSTABLE SUN VISOR EXTENDER

[76] Inventor: Romanus M. LaMont, Box F3, Wickenburg, Ariz. 85358

[21] Appl. No.: 157,781

[22] Filed: Jun. 9, 1980

[51] Int. Cl.³ ............................................. B60J 3/00
[52] U.S. Cl. ................................ 296/97 C; 24/255 R
[58] Field of Search ............... 296/97 G, 97 C, 97 R; 24/255 R, 259 R

[56] References Cited

U.S. PATENT DOCUMENTS

| | | | |
|---|---|---|---|
| 2,629,626 | 2/1953 | Ziler | 296/97 C |
| 3,195,946 | 7/1965 | Van Sickle | 296/97 C |
| 3,617,088 | 11/1971 | Graham | 296/97 C |
| 4,023,721 | 5/1977 | Erthein | 24/255 R |
| 4,044,928 | 8/1977 | Watanabe | 24/255 R |

Primary Examiner—Richard A. Bertsch
Assistant Examiner—Ross Weaver
Attorney, Agent, or Firm—Cahill, Sutton & Thomas

[57] ABSTRACT

An extender for motor vehicle sun visors includes two opposed plastic panels hinged together by a hinge section which is integral with the plastic panels. A plurality of U-shaped spring elements extend around the outer surfaces of the hinge section and the plastic panels, engaging the outer surfaces of the plastic panels, forcing them together with a relatively constant force to ensure secure gripping of a conventional sun visor by the extender, regardless of the effects of temperature on the elasticity of the hinge section.

8 Claims, 9 Drawing Figures

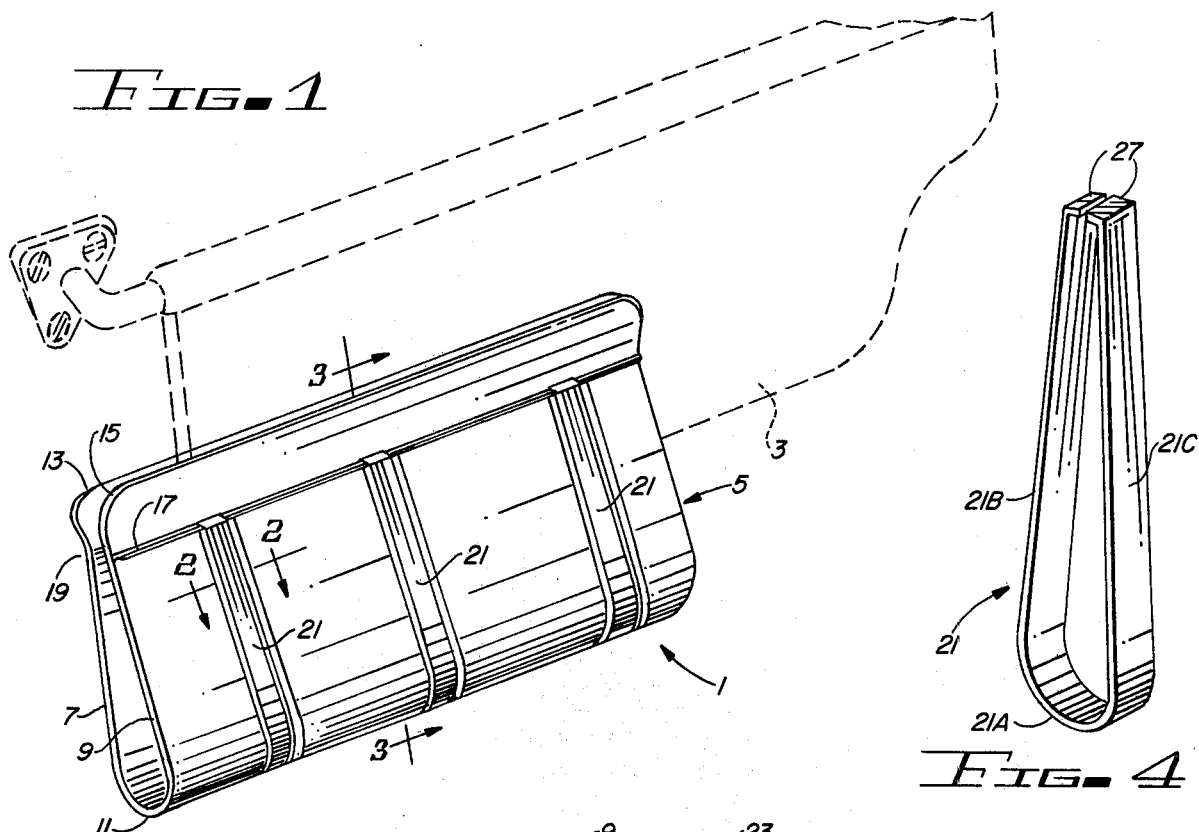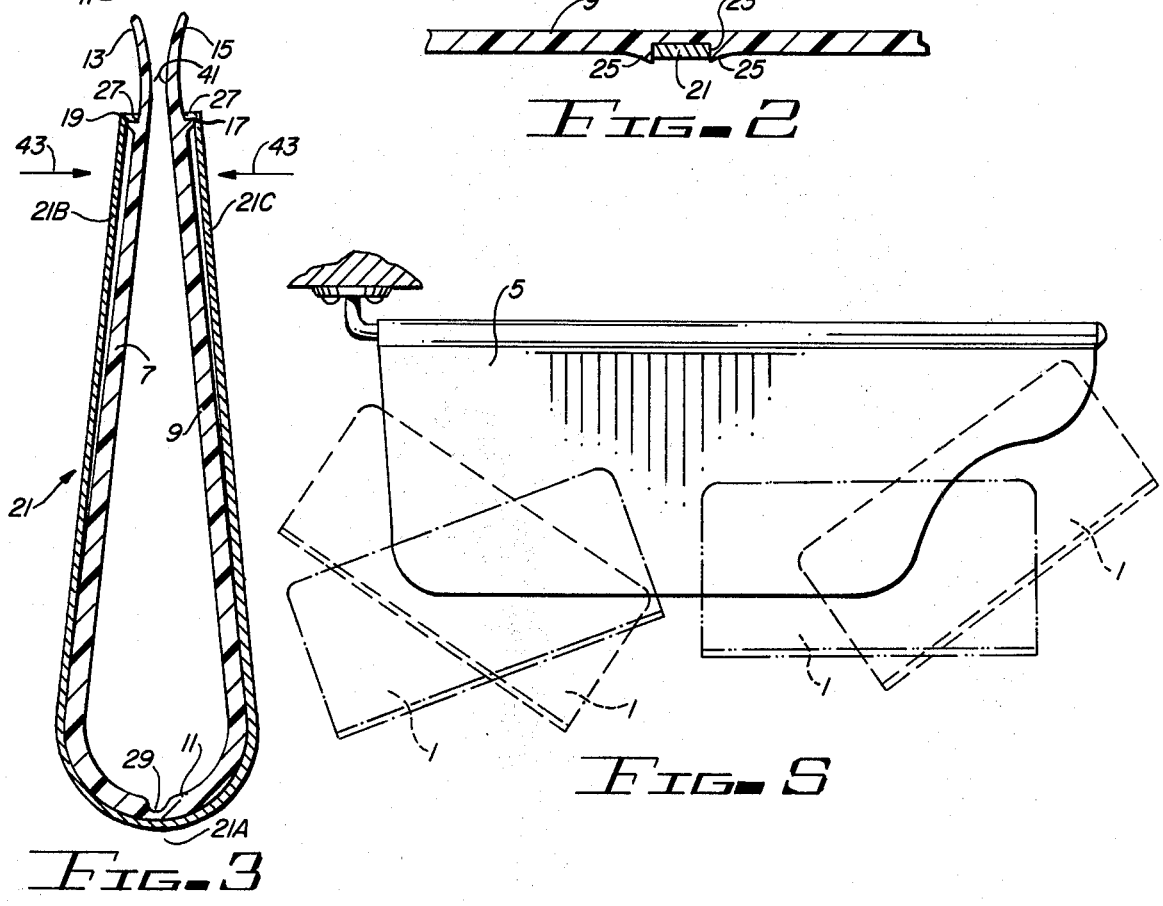

ADJUSTABLE SUN VISOR EXTENDER

BACKGROUND OF THE INVENTION

1. Field of the Invention

The invention relates to extenders which are adjustably attachable to conventional automobile sun visors.

2. Description of the Prior Art

A variety of extenders for motor vehicle sun visors have been proposed. As is well known, conventional motor vehicle sun visors usually are not adjustable to the extent necessary to shield a vehicle driver's or passenger's eyes from the sun under all driving conditions. Consequently, when the sun is very close to the horizon or is at an angle with respect to the vehicle such that its sun visor does not block the sun's rays from the driver's eyes, the safety of the driver and all occupants of the vehicle is compromised. Safety considerations suggest that a means of blocking the sun's rays at least from the driver's eyes under such circumstances would be highly desirable. Safety considerations would also suggest that the extender be movable with no significant effort by the driver (or diversion of his attention from his efforts in driving the automobile) to any location necessary to block the sun's rays from the driver's eyes. Furthermore, safety considerations would suggest that the extenders be formed primarily of plastic, rather than metal, to avoid injury to the occupants of the vehicle in the event of an accident.

The state of the art is believed to be represented by U.S. Pat. Nos. 3,617,088, 3,515,427, 4,023,855, 4,058,340, 3,169,552 and 3,695,658. U.S. Pat. No. 3,617,088 discloses a sun visor extender including an integral unit having two opposed panels connected together by a U-shaped section. That device has two "internal" shoulders disposed near the free ends of the two opposed panels for engaging a pair of corresponding "external" shoulders which must be attached along the opposed surfaces of a conventional automobile sun visor. In one embodiment of the invention, only one panel is utilized, and a pair of spring clips attached to the panel are utilized to clip the extender to a conventional sun visor in such a manner that a degree of adjustability of positioning of the extender with respect to the sun visor is achieved. U.S. Pat. No. 3,617,088 suggests that the panels may be composed of metal or plastic. If metal is used, the panels can be very dangerous if the vehicle is involved in an accident, as the sharp edges of metal panels could result in serious injury to occupants of the vehicle. The device disclosed in U.S. Pat. No. 3,617,088 is impractical because the above mentioned exterior shoulders must be glued to or otherwise attached to the vehicle's sun visor. Furthermore, the "external" shoulders greatly limit the adjustability of the extender to a considerable degree. In the above mentioned embodiment of the device having spring clips, such spring clips greatly limit the degree of adjustability of the extender.

Accordingly, it is an object of the invention to provide an inexpensive sun visor extender which is inexpensive and easily adjusted by a driver of the vehicle in which the extender is installed.

Another object of the invention is to provide a sun visor extender which is unlikely to cause serious injury to occupants of a vehicle if the vehicle is involved in an accident.

Yet another object of the invention is to provide a sun visor extender which has a higher degree of adjustability than any of the sun visor extenders of the known prior art.

Still another object of the invention is to provide a sun visor extender which provides relatively constant engagement pressure with a conventional sun visor, regardless of thickness of a vehicle's sun visor and regardless of temperature of the sun visor extender.

A still further object of the invention is to provide a sun visor extender which has such a degree of adjustability that it is movable with ease to almost any position on a vehicle's built-in sun visor so that the extender can be adjusted to and securely remain at any needed position without requiring the driver of the vehicle to divert any of his attention from driving the vehicle.

SUMMARY OF THE INVENTION

Briefly described, and in accordance with one embodiment thereof, the invention provides an adjustable sun visor extender including first and second opposed plastic panels hinged together by an integral U-shaped plastic section and a plurality of spring elements which are U-shaped and extend around the hinged section and along the outer surfaces of the opposed panels, producing a relatively constant pressure of the inner surfaces of the first and second opposed panels against the outer surfaces of the motor vehicle's sun visor, regardless of the thickness of the vehicle's sun visor and regardless of the temperature of the extender.

In the described embodiment of the invention, inwardly oriented flanges on the extreme ends of the spring clips engage corresponding ridges which prevent the spring clips from slipping off of the extender. Elongated receiving slots in which the spring clips are disposed prevent the spring clips from slipping sideways along the outer surfaces of the first and second opposed panels as the extender is slidably moved to various positions along the motor vehicle's sun visor. In one embodiment of the invention, a pair of opposed cutaway portions along opposed ends of the U-shaped plastic section permit the extender to be moved to an increased number of positions relative to the motor vehicle's sun visor. A portion of the U-shaped plastic section is of reduced thickness, so that the inward forces of inner surfaces of the first and second opposed panels against the outer surfaces of the sun visor are determined almost entirely by the spring clips.

BRIEF DESCRIPTION OF THE DRAWINGS

FIG. 1 is a perspective view of the sun visor extender of the present invention.

FIG. 2 is a section view taken along section line 2—2 of FIG. 1.

FIG. 3 is a section view taken along section line 3—3 of FIG. 1.

FIG. 4 is a perspective view of one of the spring clips of the sun visor extender shown in FIG. 1.

FIG. 5 is a diagram illustrating various positions to which the extender of FIG. 1 can be moved on a conventional motor vehicle sun visor.

DESCRIPTION OF THE INVENTION

Figure 6:
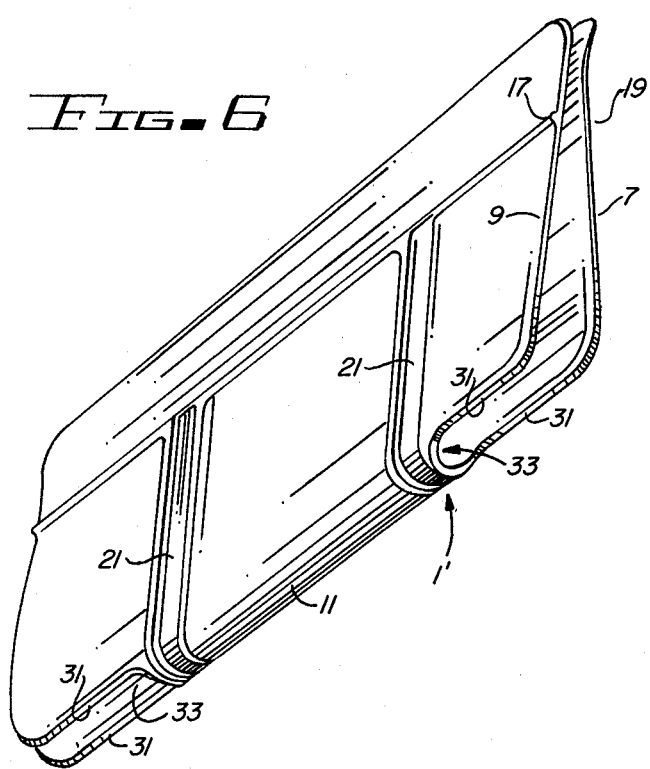
FIG. 6 is a perspective view of an alternate embodiment of the invention.
Figure 8:
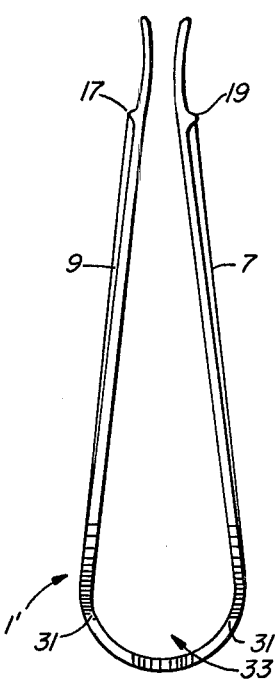
FIG. 8 is an end view of the embodiment of the invention shown in FIG. 6.
Figure 7:
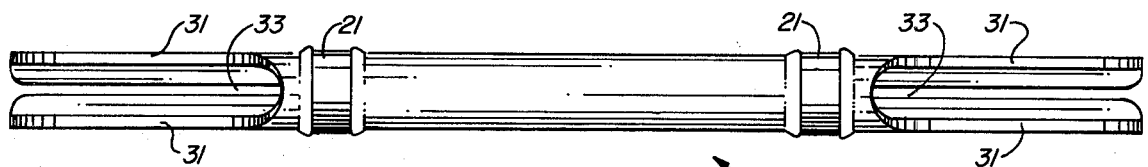
FIG. 7 is a bottom view of the embodiment of the invention shown in FIG. 6.
Figure 9:
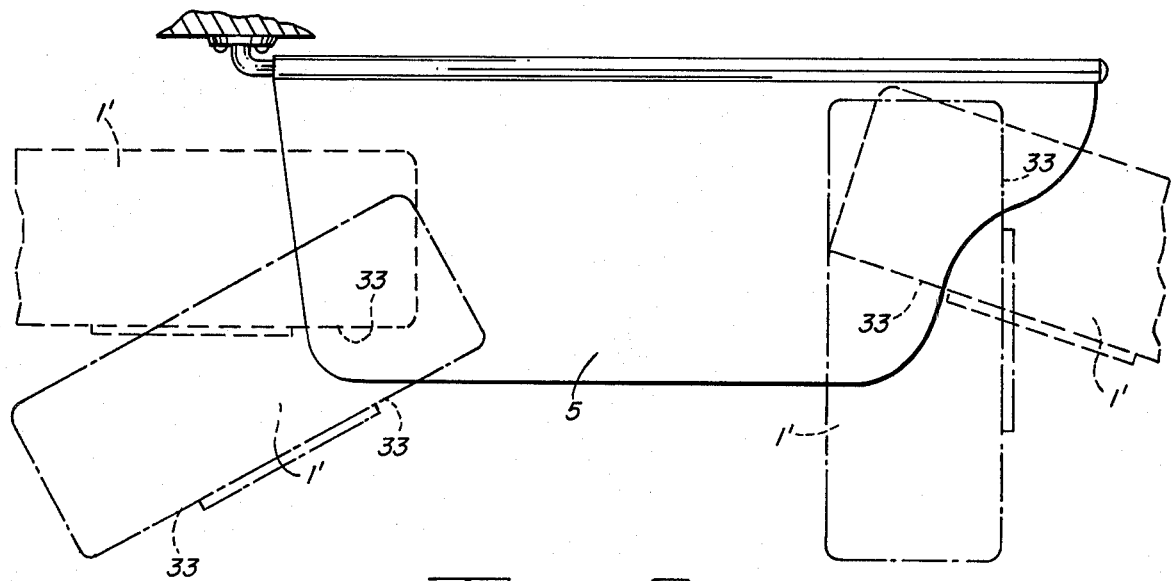
FIG. 9 is a diagram useful in explaining the wide variety of positions along a sun visor to which the extender of FIG. 6 can be moved.

Referring now to the drawings, particularly FIGS. 1-5, a visor extender 1 includes two opposed panels 7 and 9 which are spring biased to press against the opposite sides of a conventional automobile sun visor 3 with sufficient force to cause extender 1 to remain at any position to which it is laterally and/or vertically moved by the driver of the vehicle (for example, any of the positions indicated by dotted lines in FIG. 5) as he drives the motor vehicle.

Opposed panels 7 and 9 are integral with a U-shaped elastic section 11. A pair of outwardly flaring flanges 13 and 15 form the upper ends of panels 7 and 9, respectively, allowing extender 1 to be installed simply by pressing the lower edge of sun visor 3 between outwardly extending flanges 13 and 15.

A plurality of U-shaped spring clips 21 are disposed about elastic section 11. The outer surfaces of panels 7 and 9 and are biased or spring loaded to exert an inward force against the outer surfaces of panels 7 and 9, pressing the inner "pressure surfaces" 41 of panels 7 and 9 against the outer surfaces of sun visor 3 with sufficient pressure to maintain extender 1 at any position to which it is moved by the driver. However, such pressure is not so great as to make it difficult for the driver of a motor vehicle to easily slide visor extender 1 to any of the positions indicated in FIG. 5 (or numerous other possible positions) with one hand simply by grasping the lower portion of extender 1 with that hand and moving extender 1 laterally and/or vertically to the desired position necessary to block the sun from the driver's eyes.

As best seen in FIG. 4, each of spring clips 21 includes a lower curved portion 21A and a pair of legs 21B and 21C integral with curved portion 21A. A pair of inwardly oriented flanges 27 are disposed at the upper ends of legs 21B and 21C, respectively. Each of spring clips 21 is disposed in a corresponding groove 23 (FIG. 2) which extends along the outer surfaces of panels 7 and 9 and around curved section 11 so that each of spring clips 21 is recessed into the outer surface of extender 1. A pair of "banks" 25 surround and form the outer portions of groove 23, the banks 25 extending outwardly to the extent necessary to cause banks 23 to be approximately flush with the outer surfaces of the spring clips 25. This prevents spring clips 25 from being dislodged from grooves 23 by the driver's hand as he manipulates extender 1 to slid it along sun visor 3.

Each of the inwardly oriented flanges 27 engages one of retaining ridges 17 or 19, which are disposed on the outer surfaces of panels 9 and 7, respectively. As best seen in FIG. 3, ridges 17 and 19 are positioned so that spring clips 21 are retained snugly in grooves 23 and have no tendency to become dislodged from extender 1.

As also best seen in FIG. 3, the inner "pressure surfaces" 41 are located along the curved inner surfaces of flanges 13 and 15 and are the portions of extender 1 which frictionally engage the outer surfaces of sun visor 3. Spring clips 21 exert forces in the directions indicated by arrows 43 in FIG. 3. Elastic section 11 has an extra thin portion 29 thereof, as indicated in FIG. 3, in order to allow the forces indicated by reference numeral 43 to be essentially independent of the temperature dependence of the elasticity of the plastic material (such as polypropylene) of which elastic section 11 and panels 7 and 9 are composed. This has the advantage of making the force required to slid the extender 1 along sun visor 3 relatively independent of the temperature in the vehicle and prevents extender 1 from falling off of sun visor 3 if the interior of the vehicle becomes overheated because the pressure and friction between extender 1 and visor 3 are determined almost entirely by the elasticity and bias or loading of spring clips 21, which elasticity is, of course, negligibly dependent upon temperature. (It should be noted that the elasticity of most plastics of which panels 7 and 9 and hinge section 11 could be composed are quite dependent upon temperature.)

In certain portions of the country, especially the hot Southwest, temperatures inside automobiles frequently exceed 160° if the vehicles are parked in the sun with their windows rolled up. Plastic visor extenders which are designed for operation at ordinary temperatures would drop off of the vehicles when they are parked in the sun. By making the pressure exerted by the pressure surfaces 41 against visor 3 independent of the "spring tension" of the plastic of which end section 11 is made, the extender 1 will never drop off of the sun visor 3 when the car is parked in the hot sun. Furthermore, the amount of effort required by the driver of an automobile to move extender 1 along sun visor 3 will always be relatively uniform. The spring tension of visor clips 21 can be selected so that this level of exertion is such that the driver can adjust visor extender 1 without diverting any of his attention from his primary task of driving the motor vehicle safely. In other portions of the country, temperatures to which extender 1 is subjected can be far below zero. The above mentioned thinned portion 29 prevents the resulting reduced "spring tension" of the plastic of which hinge section 11 is composed from greatly increasing the amount of force needed to move extender 1 along sun visor 3 or to spread panels 5 and 7 to install extender 1 on sun visor 3.

Spring clips 21 are preferably made of spring steel, and the integral body consisting of panels 7 and 9 and hinged section 11 can be made of polypropylene. However, other metals and plastics can also be utilized. Preferably, the total force which is exerted by pressure surfaces 41 onto the outer surfaces of sun visor 3 is approximately four pounds.

An alternate embodiment 1' of the invention is shown in FIG. 6, wherein two lower cutaway portions 33 are provided in elastic section 11. The cutaway portions expose lower outer edge portions 31 of panels 7 and 9, as can be seen by referring to FIGS. 6-8. Otherwise, the structure of extender 1' shown in FIGS. 6-9 is entirely similar to that of extender 1 of FIGS. 1-5. Provision of cutaway portions 33 provides a significant additional advantage in that the extender 1' can be moved to positions not possible with visor extender 1 (FIG. 1) because edge portions of sun visor 3 can fit between the edges 31 around cutaway portions 33. This can be best seen by referring to FIG. 9, which indicates in dotted lines several positions of extender 1' which are not possible with visor extender 1.

Spring clip retaining ridges 17 and 19, as shown in FIGS. 1 and 6, can extend along the entire outer surfaces of panels 9 and 7, respectively, in order to provide lateral reinforcement for those panels. However, if panels 7 and 9 need no such reinforcement, then retaining ridges 17 only need to be provided at the points at which they are engaged by flanges 27 of spring clips 21. Alternatively, openings can be provided in the panels 7 and 9 (instead of ridges 17) for receiving flanges 27 of spring clips 21 if ridges 17 are omitted.

While the invention has been described with reference to several particular embodiments thereof, those skilled in the art will be able to make various modifications to the disclosed embodiments of the invention without departing from the true spirit and scope thereof, as set forth in the appended claims. For example, spring clips 21 can be composed of round elastic metal wire instead of the flat metal springs mentioned previously.

I claim:

1. A sun visor extender comprising in combination:
   a. first and second panels each having first and second opposed edges, each of said first and second panels having an outer surface and also having an inner pressure surface located adjacent to said second edge thereof, said first and second panels each being of substantially the same size;
   b. hinging means attached to said first edge of each of said first and second panels and integral with and extending between said first and second panels for hingably connecting said first and second panels together, said hinging means maintaining said first and second edges a predetermined distance apart;
   c. a plurality of removable spring clips disposed along the outer surfaces of said first and second panels and said hinging means for urging said first and second pressure surfaces, respectively, against opposed outer surfaces of an automobile's sun visor; and
   d. retaining means for preventing sliding of said spring clips along said outer surfaces of said first and second panels, each of said spring clips including a U-shaped spring metal member having two leg portions which extend along said outer surfaces of said first and second panels, respectively, and a rounded portion joining said two leg portions and extending along an outer surface of said hinging means, each of said leg portions having an inwardly oriented end portion disposed on the free end thereof for engaging said retaining means, each of said U-shaped spring metal members being removable from said sun visor by merely spreading the free ends of the two leg portions of that U-shaped spring metal member apart and away from said retaining means, said first and second panels being composed of plastic, said spring clips being composed of elastic, relatively temperature-insensitive metal.

2. The sun visor extender of claim 1 wherein said plastic is polypropylene and said spring clips are composed of spring steel.

3. The sun visor extender of claim 1 wherein said retaining means includes first and second ridges extending outwardly from said outer surfaces of said first and second panels, respectively.

4. The sun visor extender of claim 1 wherein said predetermined distance is less than the maximum thickness of said sun visor.

5. The sun visor extender of claim 1 wherein said first and second panels each include outwardly inclined flanges extending along said second opposed edges, respectively, for effecting smooth urging of said sun visor extender onto said sun visor.

6. The sun visor extender of claim 1 further including grooves disposed in said outer surfaces of said first and second panels and said hinging means, said plurality of spring clips each being disposed in and retained in one of said grooves by means of said retaining means.

7. The sun visor extender of claim 6 wherein the depths of said grooves are approximately equal to the thickness of said spring clips.

8. The sun visor extender of claim 1 wherein said hinging means, said first panel and said second panel are integral, and wherein said hinging means includes a thinned portion which is sufficiently thin that it exerts negligible spring force upon said first and second panels compared to the spring force exerted upon said first and second panels by said spring clips.

* * * * *